Patented Sept. 14, 1954

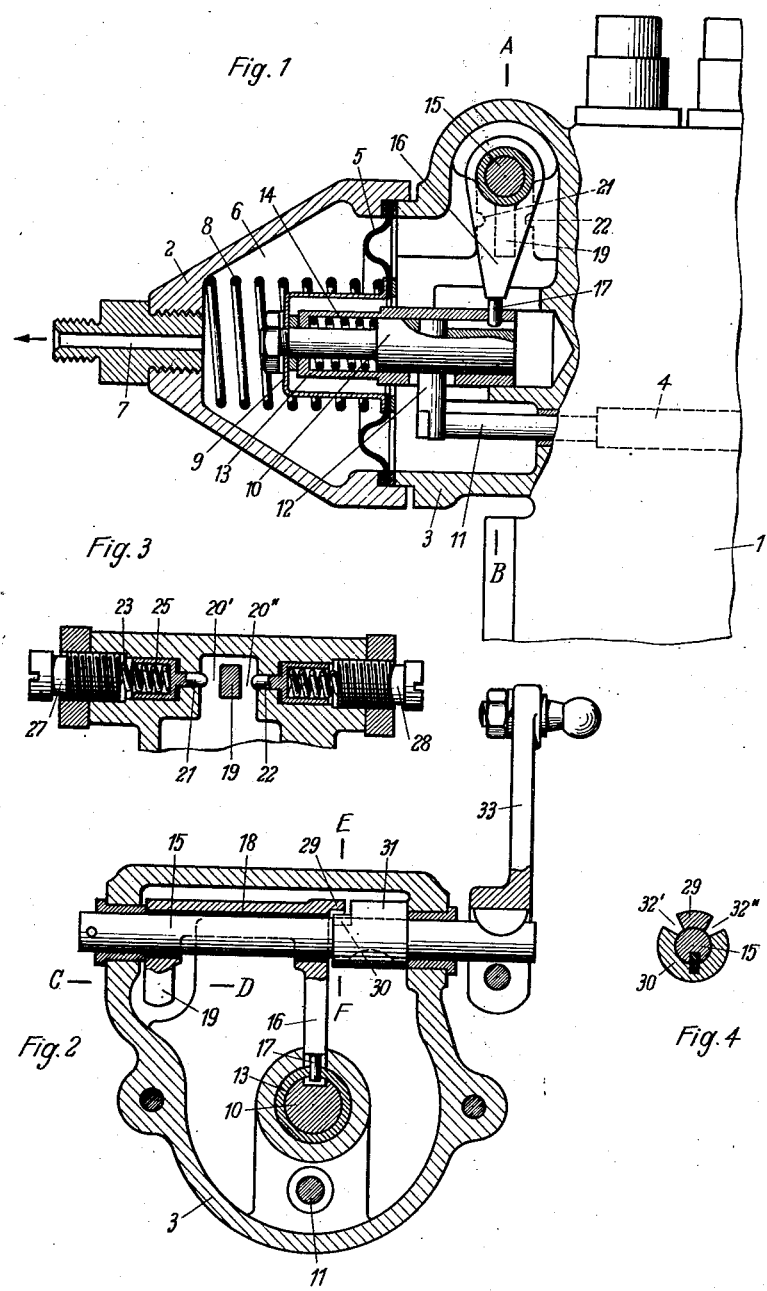

2,688,926

UNITED STATES PATENT OFFICE 2,688,926

REGULATING DEVICE FOR FUEL INJECTION PUMPS

Heinrich Karl Links, Stuttgart, Germany, assignor to Daimler-Benz Aktiengesellschaft, Stuttgart-Unterturkheim, Germany Application May 27, 1950, Serial No. 164,704

Claims priority, application Germany June 1, 1949

11 Claims. (Cl. 103—41)

The invention is concerned with a regulating device for fuel injection pumps, in particular of Diesel vehicle engines, with automatic regulating means which depends for example upon the rotative speed of the engine and is regulated for example by pneumatic or hydraulic means.

It is one object of the invention to make possible, besides the automatic regulating of the fuel injection, an adjustment of the member which regulates the quantity of fuel to a position, for example, a stop position or an overload position, which is independent therefrom and which can be operated at random and is normally not affected by the automatic regulation.

It is another object of the present invention to achieve such an additional possibility of adjustment by providing means which are particularly simple and which consist of relatively few parts and are reliable in service.

It is furthermore another object of the invention to permit regulating movement of the device beyond the normal automatic regulating movement, particularly for the regulation of idle motion and also an automatic regulating movement if the regulating power exceeds a certain magnitude.

In accordance with the above objects, it is therefore a material characteristic of the invention that the regulating stroke for the self-acting regulating device is limited by means of elastic stops, the elastic force of which is rated in such a manner that it is not or normally cannot be overcome by the regulating power of the self-acting regulating device. Furthermore, provision is made according to my invention for an additional adjusting device which is preferably operated from the driver's seat of the vehicle and which increases the regulating stroke by overcoming the elastic force of the stops. According to another characteristic feature of the invention, the additional adjusting device acts preferably directly upon the adjusting means of the self-acting regulating device by adjusting the latter by pressing the elastic stops back in a guided manner. The regulating stroke in either direction is determined by stops, which determine an idle motion position and a full load position and which can be pressed back by means of the additional regulating device for adjustment to stop and overload position, i. e., the start position. Furthermore, provision is made for a special range of regulation for the idling speed by the insertion of a spring which is prestressed or pretensioned. Furthermore, the elastic stops or their spring themselves can be regulated in an adjustable manner according to my invention.

In the drawing is shown a preferred example of construction of the invention in which:

Fig. 1 shows a longitudinal section through the regulating device which is mounted on the fuel injection pump of the engine;

Fig. 2 shows a cross section through line A—B of Fig. 1;

Fig. 3 shows a section along line C—D; and

Fig. 4 shows a section along line E—F of Fig. 2.

Casing 1 of the fuel injection pump shows the regulating device for the adjustment of the member which regulates the intake quantity of fuel by means of a governor rack 4 which operates the pump pistons. Said device is arranged in an adjoined casing piece 3 which is covered by housing 2. The self-acting or automatic regulating device which depends for effective action upon the number of revolutions of the engine, is actuated by a diaphragm or membrane 5, the regulating space 6 of which is connected to the air suction supply tube or vacuum line of the engine through the pipe line 7, and which is loaded by the full-load regulating spring 8. The spring is supported at one end against the governor housing 2 and at the other end against the flange of a sheet metal cap 9 which in turn is also connected to membrane 5 and which is tightly screwed on the end of the governor axle or governor rod 10. The governor rack 4 is adjusted in a longitudinal direction by means of a cross pivot 12 which is connected to the governor rod 10 and engages the extension 11 of the governor rack 4.

In addition, a sleeve or housing 13 is arranged slidably on the governor axle or governor rod 10. An idling speed spring 14 is supported at its right end on a collar at the governor rod 10 and at its left end against an inwardly directed collar on sleeve or housing 13, so that the latter sleeve is urged against the governor cap 9 under a spring tension.

A shaft 15 is supported in casing 3, and an adjusting lever 16 is rotatably supported on shaft 15. Adjusting lever 16 engages a bore in sleeve 13 by means of a pivot 17. The adjusting lever 16 forms a unitary piece with stop lever 19 by means of the common hub 18. The stop lever 19 is arranged in housing 3 between stop members 21 and 22, whereby in a middle position, play 20' is provided between the stop lever 19 and the stop member 21, on the one hand, and play 20'' between the stop lever 19 and the stop member 22, on the other.

The stop members 21 and 22 are formed as small pistons 25 and 26 which are spring loaded by means of helical springs 23 and 24, respectively. The tension of the springs may be adjusted by rotation of adjusting screws 27 and 28. The hub 18 of the levers 16 and 19 carries at one of its ends a segment or stop member 29 which cooperates with its counter-part 30 provided on sleeve 31 with play 32' and 32'', the sleeve 31 being keyed on shaft 15, as shown in Figure 4. A lever 33, which may be adjustable from the driver's seat by means of a Bowden cable, is keyed on one of the ends of the shaft 15 and serves for purposes of rotation thereof.

The operation of the device is as follows:

In the range of full load, i. e., with relatively low under pressure or great vacuum in space 6, the membrane 5 is displaced against the effect of the spring 8, to an extent, which is the greater the higher the number of revolutions and therewith the vacuum in the governor space 6. The governor rack 4 adjusts thereby the fuel injection pumps for smaller amounts of filling or injection. The spring 14 and the sleeve 13 take part in this movement, until the levers 16 and 19 with a low number of revolutions and high filling or injection, abut against stop 22 or with a high number of revolutions and low filling abut against the stop 21. The stop springs 23 and 24 are constructed strong enough so that their tension cannot be overcome by the movement power of the membrane 5. If the vacuum, i. e., above all in the range of idling speed surpasses a certain set value, which is determined by the spring pressure of the spring 14, while the levers 19 and 16, which position sleeve 13, are adjacent to the stops 21, another change of position of the governor rod or of the governor rack 4 takes place in that the spring 14 is compressed by the governor rod 10 contrary to its spring pressure thereby operating jointly with spring 8 to govern the idling speed range of the engine.

The lever 33 is normally adjusted so that it permits lever 16 a free movement between the stops 21 and 22 corresponding to the play 32' and 32''. By turning the lever 33 into the one or the other end position, the stop segment 30, in one or the other direction of rotation, can be brought to abut against the stop segment 29 of the hub 18, respectively of the levers 16 and 19, and can further adjust them by pressing the stops 21 and 22 back against the effect of the springs 23. By pressing back stop 21 or the stop piston 25 so as to abut against the adjustment screw 27, the filling or fuel injection of the engine may be completely interrupted in this manner, when by means of sleeve 13 and the spring 14 the governor rod 10 and the member 11 regulating the rack 4 are moved to the left and the engine brought to a halt. A corresponding pushing back of the stop 22 adjusts the governor rack 4, for example, for purposes of starting, to overload capacity.

While a preferred embodiment has been shown and described, the adjustment of the governor rack or of another corresponding member regulating the quantity of fuel can also be executed in a different manner. Instead of using pneumatic means, the self-acting regulating can also be performed by means of a hydraulic, mechanic, electric or any other device. It is also possible to combine the two levers 16 and 19 as one single lever or as another stop member.

The invention can be utilized for vehicle or other engines, for diesel or other fuel injection engines.

What I claim is:

1. A regulating device for fuel injection pumps of injection combustion engines, comprising a regulating mechanism for automatically regulating the quantity of fuel, a regulating member in said regulating mechanism, elastic means for limiting the regulating stroke of said regulating member, said member having spring actuating means to resist the automatic regulating power of the regulating mechanism, and an adjustment device for adjusting the elastic means against the effect of the springs to permit an enlarged regulating stroke for the regulating mechanism.

2. A regulating device according to claim 1 wherein the elastic stops define an idle motion position and a full load position of the regulating mechanism and permit the regulating mechanism by overcoming the elastic stops by means of the mentioned regulating device to be adjusted beyond this to a stop position and a super load position.

3. A regulating device for fuel injection pumps of injection combustion engines, comprising a regulating mechanism, for automatically regulating the quantity of fuel entering the engine, a stop member, an elastic stop member for the regulating mechanism, elastic stop means limiting the regulating stroke of the stop member, the power of said elastic member being adapted to resist the automatic regulating power of the regulating mechanism, and an adjustment device for adjustment of the elastic stop member against the effect of the spring whereby an increased regulating stroke is made possible for the regulating mechanism.

4. Regulating device in accordance with claim 3, wherein the adjustment device is in cooperative connection with the regulating mechanism for adjusting and guiding the same by overcoming the spring power of the elastic stop.

5. A regulating device in accordance with claim 3 wherein the elastic stop is formed by a piston and a spring which charges the piston and presses against a relatively solid stop from which it can be lifted by the adjustment device.

6. A regulating device for fuel injection pumps of injection combustion engines and the like, comprising a regulating mechanism for automatically controlling the quantity of fuel therefor, a stop member connected with the regulating mechanism, at least one elastic stop member against which said stop member rests for limitation of the stroke of the regulating mechanism, the spring power of said mechanism being rated so that it is not overcome by the automatic regulating power of the regulating mechanism, and an adjustment device for adjusting the stop member to overcome the spring power of the elastic stop.

7. A regulating device according to claim 6, including a spring between the regulating mechanism and the stop member, said spring cooperating with the stops at the regulating mechanism and the stop member whereby it keeps them normally in a coupling connection and effects adjustment of the regulating mechanism when the automatic regulating power exceeds a certain magnitude.

8. A regulating device for fuel injection pumps of injection combustion engines, comprising a mechanism for regulating the quantity of fuel automatically, a stop member in said mechanism, a pair of elastic stops for the stop member for permitting free movement to said stop member said movement being limited by the stops, an adjustment member independent from the regulating mechanism with stops, another further pair of stops at the stop member cooperating with the adjustment member and permitting free relative movement at least to the same extent as between the stop member and the elastic stops, so that the stop member is normally not prevented in its movement by the adjustment member, said second set of stops being adjustable by adjusting the adjustment member by means of the stops which are active between them by overcoming the spring power of the elastic stops, beyond the stroke limited by the latter.

9. A regulating device according to claim 8 wherein the stop member and the adjustment member are arranged revolving around a same axle, said stops acting between the stop member and the adjustment members being formed like claws, said stop member carrying an arm, on both sides of which the elastic stops are arranged.

10. A regulating device for fuel injection pumps of injection combustion engines, comprising a quantity regulating member for regulating the quantity of fuel, said regulating member being adjusted depending upon the automatic regulating power in the engine, and being connected to the quantity regulating member, a sleeve-like member surrounding the last mentioned regulating member, a stop at each end of the latter member and at the sleeve-like member, a spring between both stops for pressing both members against their stops which can be lifted by these in reaction against the spring, a stop member coupled with the sleeve-like member, at least one elastic stop, against which the stop member is supported for limitation of the stroke of the regulating mechanism and the spring power of which is rated to resist the automatic regulating power of the regulating mechanism, and an adjustment device for adjusting the stop member for overcoming of the spring power of the elastic stop.

11. A regulating device in accordance with claim 10 in combination with an adjustable element which reacts on pressure changing with the number of rotations of the engine and which is coupled with the regulating member mentioned in the second place whereby the power of the mentioned spring is overcome and the regulating member is automatically readjusted, when a certain regular pressure is exceeded and the stop member is stopped at one of the elastic stops.

References Cited in the file of this patent

UNITED STATES PATENTS

| Number | Name | Date |
| --- | --- | --- |
| 2,079,659 | Olin | May 11, 1937 |
| 2,080,746 | Schweizer | May 18, 1937 |
| 2,127,211 | Edwards | Aug. 16, 1938 |